United States Patent [19]

Visceglia et al.

[11] 4,133,762

[45] Jan. 9, 1979

[54] COIL TYPE FILTER

[76] Inventors: Marco P. Visceglia, 6118 Liebig Ave., Bronx, N.Y. 10471; Robert Lorenzo, 12 Regina Ct., Bay Shore, Long Island, N.Y. 10466

[21] Appl. No.: 640,015

[22] Filed: Dec. 12, 1975

[51] Int. Cl.$^2$ .................. B01D 23/14; B01D 35/18
[52] U.S. Cl. ............................... 210/186; 55/269; 55/387; 210/274; 210/289; 210/290
[58] Field of Search .............. 55/269, 316, 387; 210/290, 184, 186, 266, 274, 284, 287, 288, 289

[56] References Cited

U.S. PATENT DOCUMENTS

| 2,718,904 | 9/1955 | Polye | 73/410 |
| 3,463,615 | 8/1969 | Sochor | 55/36 |
| 3,834,130 | 9/1974 | Bissada et al. | 55/316 |

Primary Examiner—Charles N. Hart
Assistant Examiner—Ivars Cintins
Attorney, Agent, or Firm—Spellman & Joel

[57] ABSTRACT

A coil type filter for diversified applications comprises a spiral wound coil having an inlet and an outlet at opposite ends thereof, said inlet and outlet apertures having a screen positioned to retain the filtering element within the coil. Couplings are provided on the exterior of the coil at each end for connection to other portions of a fluid flow system. The interior of the coil is partially filled with activated carbon granules which perform the filtering operation. In a modification of the invention, the coil would be positioned within a housing which contains a circulating fluid for maintaining the temperature at predetermined levels. In another embodiment of the invention, the spiral wound coil is mounted within a housing with the inlet and outlet both extending outwardly from the same portion of the housing. The filter outlet is a substantially straight tube extending from the interior end portion of the coil substantially parallel to the axis of said coil and along its entire length. A thermostatically controlled heating element may be mounted within the housing to control the temperature of the fluid within the coil.

The coil type filter has wide application in water purification, medical and scientific applications, waste water treatment, gasoline and solvent vapor adsorption and filtration of various fluids and gases. The filter has the advantage of compactness with a long length of tubing fitting into a confined space thereby providing an extended contact time with the fluid or gas being filtered. The filter is also relatively inexpensive and adaptable to a broad variety of customer designs and may be readily reactivated by reverse flow of the fluids.

7 Claims, 3 Drawing Figures

COIL TYPE FILTER

BACKGROUND OF THE INVENTION

This invention relates to filters and particularly to coil type filters having broad applications. The prior art discloses the use of coils in general and the use of activated charcoal in filters. Charcoal filters are disclosed in general in Shames U.S. Pat. Nos. 2,707,624, 2,954,936 and 3,635,405.

A filter with temperature control means employing a coil is disclosed in U.S. Pat. No. 2,428,486 to F. A. De Puydt while U.S. Pat. No. 3,774,772 to Yeths shows arcuately shaped filter elements. Other prior art patents, of course, may exist and be pertinent in this area since the patents mentioned above are not intended to be an all-inclusive list of pertinent prior art patents.

Essentially, the emphasis on eliminating pollution and preserving the environment has lead to the demand for new and improved methods and means for eliminating contaminants and pollutants and the present invention is directed towards this end. The invention is also useful in a wide variety of applications such as water purification, medical and scientific research including dialysis units, blood detoxification units and waste water effluent filtering. The invention may also be used in gasoline vapor adsorption, solvent vapor adsorption and smoke or exhaust fume filtering. It also has use in the filtration of various fluids on a commercial scale such as rum, sugar, etc. Thus, it will be seen that the present invention is widely adaptable and no present filter has the versatility where the basic design can be readily adapted to other uses without a complete reconstruction thereof.

The coil filter of the present invention has a distinct advantage over other filters in its compactness which permits a relatively long length of filter in a confined space thereby increasing contact time. There is also an adaptability to custom designs using various coil shapes and sizes and the possibility of adding special ingredients to the activated carbon for specific applications. Temperature control is easy to maintain either by circulating fluids, by means of a heating element mounted adjacent the coil or by the use of fins which may be mounted to the coil.

The unique filter described herein has the filtering medium located within a portion of the coil. The filter is continuous being connected into the line by mechanical means. The hook-up may be in a series or parallel arrangement for added filtration or volume filtration depending on the particular application. With the filter ingredients located within the coil, the design eliminates gaskets which may deteriorate and leak.

SUMMARY OF THE INVENTION

The present invention relates to a coil type filter wherein activated carbon or other ingredients of a suitable nature are positioned inside the coil to form a filter. The coil may be of a general spiral wound configuration or a variation thereof. The coil is connected into a product line containing the product being filtered and the carbon or other ingredients or combination of ingredients eliminates the undesirable elements from the product stream as it flows through the filter. In a further modification of the invention, the coil is encased in a housing which contains a circulating fluid which controls the temperature of the filter and hence, the temperature at which filtration takes place. The housing includes an inlet and an outlet for forcing the temperature controlled fluid therethrough and about the coiled filter. In another modification, a thermostatically controlled element is mounted in a manner extending axially within the casing and is surrounded by the coils to precisely regulate the temperature of filtration. The inlet and outlet of the coil filter extend outwardly from the housing on the same side or the same face of the housing so that the exit portion thereof contains a straight run of tubing parallel to the thermostatically controlled elements.

Accordingly, an object of this invention is to provide a new and improved coil type filter.

Another object of this invention is to provide a new and improved in-line coil filter having a variety of applications and including activated charcoal as the filtering element thereof.

A more specific object of this invention is to provide a new and improved in-line coil type filter having temperature control means to regulate the temperature of the fluid being filtered and having activated carbon positioned within the coil to serve as the filtering element.

BRIEF DESCRIPTION OF THE DRAWINGS

Other objects and advantages may be seen from the following description when viewed in conjunction with the accompanying drawings wherein.

DETAILED DESCRIPTION OF THE INVENTION

Figure 1:
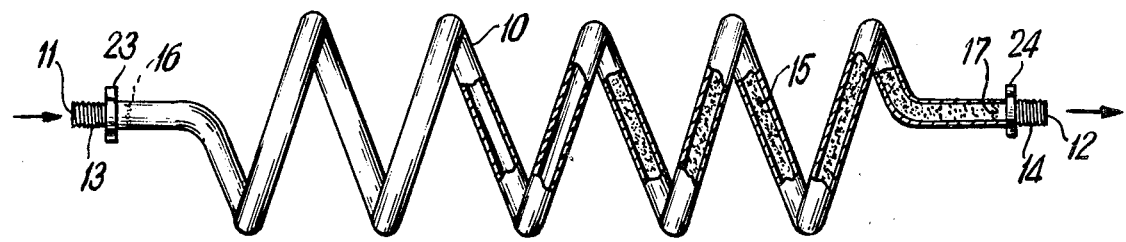
FIG. 1 is a side view of a spiral wound coil filter comprising the present invention with portions shown in cross-section.

Referring now to the drawings, the invention as shown in FIG. 1 comprises a spiral wound coil 10 having an inlet 11 and an outlet 12. The inlet 11 and outlet 12 may include fittings 13 and 14 for coupling into a product line. A hex portion 23 and 24 may also be included at each fitting 13 and 14 for coupling purposes. A predetermined amount of activated charcoal or carbon granules 15 are positioned within the coil 10 in order to perform the necessary filtering operation. Screens 16 and 17 are mounted in the coil 10 at a predetermined distance from the respective inlet 11 and outlet 12 in order to retain the granules within the coil 10.

Figure 2:
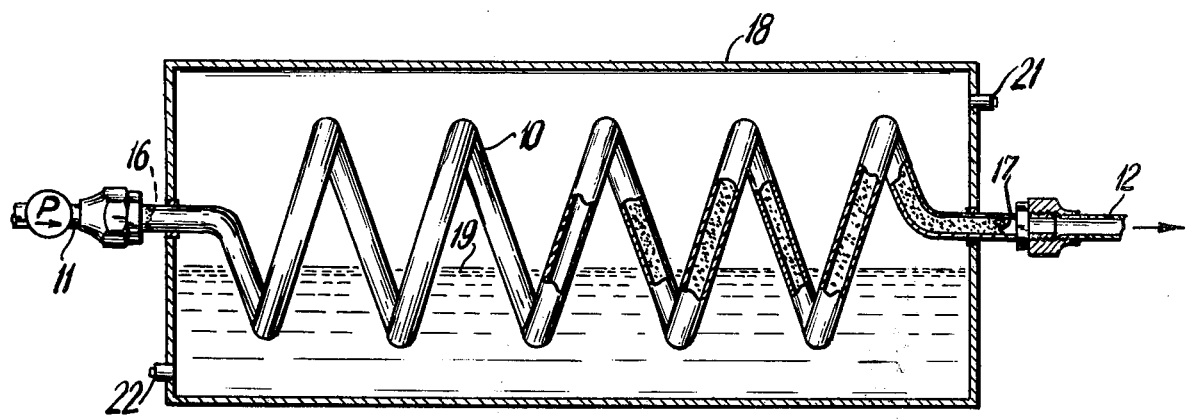
FIG. 2 is a cross-sectional side view of a coil type filter mounted within a suitable housing, and, FIG. 3 is a cross-sectional side view of a coil type filter comprising the present invention wherein a thermostatically controlled element is mounted within the housing.

The carbon granules 15 may be combined with other ingredients or catalysts depending upon the filtration action which is desired. Normally, the activated charcoal would only fill a portion of the coil 10 as shown. The filter can be reactivated either by reversing the flow or by heating the coil 10. The tubing is preferably copper although certain embodiments of the invention may require glass tubing, steel tubing, plastic tubing or tubing made of other materials. Generally, as shown in FIG. 2, a pump would be provided where the pressure of the fluid or gas would be insufficient to force the substance through the filter.

The filter coil 10 can be extremely compact with a long length of filter being contained in a very confined space. The length of the coil 10 provides an extended contact time with the filter. Nevertheless, despite these advantages, the filter is readily manufactured and is quite inexpensive. It is also possible to custom design the coil shape or size to accomodate specific filtration situations. The coil type filter has the added advantages of adaptability to temperature control, ease of reactivation and being vibration proof and explosion proof.

The coil 10 with the filter ingredients inside is a filter which does not require gaskets which may deteriorate and leak. The filter is also continuous and may be connected into the lines by mechanical means such as conventional fittings. The coil 10 may also be mounted in any number of parallel or series combinations to give the desired filtration. Variations in coil shape such as decreasing spirals, serpentine coils, etc. or in coil size may be employed.

The subject coil design has unique characteristics including a particular flow of fluid which is broken up as it passes through the coil by the swirling action herein so that the flow becomes somewhat turbulent thereby enhancing the filtration operation. With the coil design there is also the advantage of ready adaption to natural cooling and heating because of the expansive surface area exposed to the atmosphere. By the same token the coil 10 is ideal for fin cooling with fins (not shown) added to the coil 10 during manufacture.

One of the great advantages of the present invention is compactness whether it be in smoke and exhaust control wherein smoke stacks can be compressed into a relatively confined space or in filtration of water wherein water treatment plant size can be reduced since the activated carbon or charcoal in a coil arrangement permits an extremely efficient filter. It is estimated that one cubic centimeter of activated carbon has a surface area of 10,000,000 square centimeters. This material is especially effective in adsorption because of the great surface area presented by its porous structure. In water filtration plants, activated charcoal is ideal for removing undesirable tastes, color, odor, rusts and detergent. It is also remarkably efficient in trapping and removing organic chemical continminants and it may be used to remove carcenogenic compounds.

The coil filter is further ideally suited for use in an adsorbent type blood detoxification unit. The coil filter filled or partially filled with charcoal probably best suited for this purpose is charcoal made from coconut shells which may be treated or coated with various materials. In cases of drug overdoses or poisonous compounds in the blood, a patient can be hooked up to a blood purifier of the present design and his blood pumped through a filter at the rate of 2 to 5 ounces per minute. The toxic material would normally be filtered out in 2 to 3 hours. Noticeably, the filter 10 may be appropriately temperature controlled during the operation.

Figure 3:
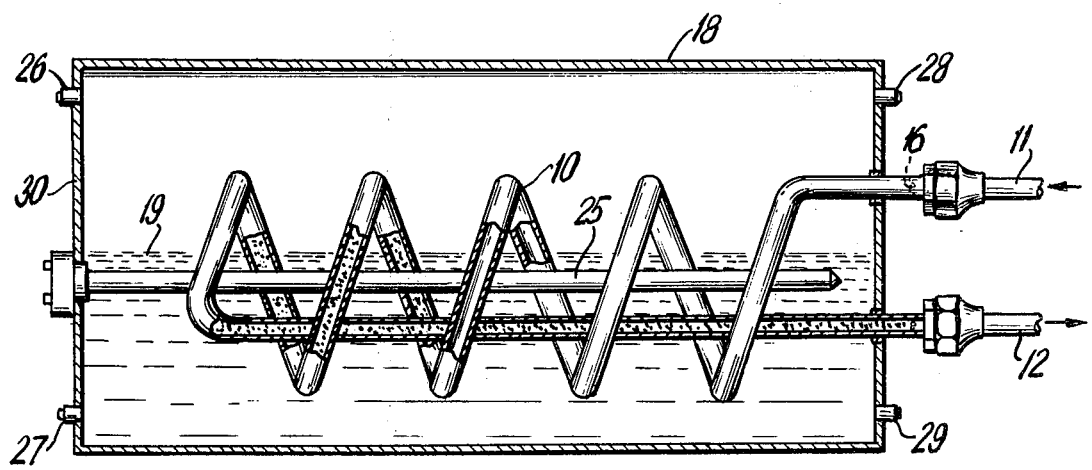

As another point, a coil filter 10 can be used as a fuel filter particularly where methanol is used as a fuel. The filter can be equipped with a heating element as shown in FIG. 3 to satisfy the requirements of preheated fuel. Ordinary filters, as we know them today, are not satisfactory in a methanol fuel system while a coil filter made of copper or stainless steel will provide long life and satisfactory service in this environment. Furthermore, a coil type filter of the type described herein can be used in late model automobiles with fuel evaporative emission controls to store fuel tank vapors until they are drawn into the intake manifold.

The coil filter 10 is ideally suited as an air intake or exhaust filter for aircraft and automotive engines and also as an air intake filter on air conditioning units. Coil shapes and sizes may be readily varied to fit into the confined or limited space of aircraft or automotive engine compartments and accomplish the desired filtration action.

FIG. 2 discloses a second embodiment of the invention with a coil 10 encased in a housing 18 which may have an inlet 21 and an outlet 22 for circulation of a fluid 19 in order to maintain the filter 10 at a predetermined temperature. This would be necessary in applications where the temperatures of the materials or product flowing therethrough must be maintained at a critical temperature. It is, of course, possible in this embodiment that the inlet 21 and outlet 22 may be reversed under specific conditions.

FIG. 3 discloses a further embodiment of the invention wherein the coil filter 10 is encased within a housing 18 but a thermostatically controlled element 25 of an elongated configuration is perpendicular to one wall 30 of the housing 18 and extends outwardly for coupling to a power source. The heating element is surrounded by the coil in order to even more precisely control the temperature of filtration. Another feature shown in this embodiment is the fluid circulation arrangement wherein an upper inlet 26 and a lower inlet 27 are provided on one wall 30 of the housing 18 and an upper outlet 28 and a lower outlet 29 are provided on the opposite wall 40. If any of the inlets 26 or 27 or the outlets 28 or 29 are not in use, plugs may be inserted. The filter outlet 12 comprises a straight run of tubing from the end portion of the coil 10 so that the unit can be compact in size and yet have an inlet and outlet on the same side of the housing 16.

In both FIGS. 2 and 3, the housing 18 may be insulated to isolate the coil 10 from ambient conditions and various instrumentation may be coupled to the arrangement to automatically control temperature and flow conditions. Suffice it to say that the disclosed arrangement is extremely flexible and readily adaptable to multitudinous uses.

While the invention has been explained by a detailed description of certain specific embodiments, it is understood that various modifications and substitutions can be made in any of them within the scope of the appended claims which are intended also to include equivalents of such embodiments.

What is claimed is:

1. A flow through coil type filter for fluids comprising:
    a hollow coil having an inlet at one end, an outlet at the other end thereof and a predetermined number of turns therebetween to provide sufficient contact time and turbulence within the filter, to enhance the adsorption process in the coil as the fluid flows therethrough,
    a pair of screens positioned within the coil and mounted completely across the inlet and the outlet of said coil respectively,
    a predetermined quantity of activated carbon granules positioned within said coil and partially filling said coil, said activated carbon granules serving as the filtering element and, being capable of reactivation within the coil, and,
    means for readily coupling said filter to a fluid flow system for filtering purposes.

2. A coil type filter in accordance with claim 1 wherein:

the coil comprises a spiral wound coil of a predetermined size and the coupling means comprises a threaded coupling at the inlet and the outlet thereof, said threaded couplings being located on the exterior of the coil for coupling to a fluid flow system, and means for forcing the fluid through the coil.

3. A coil type filter in accordance with claim 2 wherein the filter further includes:
a casing mounted about the coil with the inlet and outlet of said coil extending outwardly from opposite sides of the casing and said casing having an inlet and an outlet for the introduction of a temperature controlled fluid about the coil filter.

4. A coil type filter in accordance with claim 2 wherein:
the coil comprises a coil of a predetermined length and diameter having a mixture of carbon granules and particular catalytic ingredients filling a set portion of the coil and including a pressurized gas supply coupled to said coil to force said gas through the filter for removal of particular substances.

5. A coil type filter in accordance with claim 1 further including:
a casing mounted about said coil, and,
a thermostatically controlled elongated element mounted to one wall of the casing and extending axially within the coils of said coil type filter to control the temperature thereof, and,
wherein the inlet and the outlet of the coil extend outwardly from one wall of the casing, said outlet comprising a straight run of tubing extending from the interior end of the coil to the casing wall, and,
further including inlet and outlet means in the casing for introduction of a fluid to said casing for temperature control purposes.

6. A coil type filter in accordance with claim 5 wherein:
the casing comprises a sealed container including a plurality of inlets and outlets for the introduction of temperature controlling fluid, a set level of said fluid being retained within the container.

7. A coil type filter in accordance with claim 1 wherein:
the tubing comprises copper tubing of a predetermined size and the filter further includes a second coil type filter coupled in series with said filter and wherein the carbon granules completely fill said tubing.

* * * * *